United States Patent [19]

Yoshihara et al.

[11] Patent Number: 4,560,713

[45] Date of Patent: Dec. 24, 1985

[54] REINFORCED PLASTIC MOLDING

[75] Inventors: Mitsuo Yoshihara; Yoshitada Morikawa; Yasuo Yamamoto; Mitsuharu Komada; Masaaki Hattori, all of Osaka, Japan

[73] Assignee: Nitto Electric Industrial Co., Ltd., Osaka, Japan

[21] Appl. No.: 690,809

[22] Filed: Jan. 14, 1985

[30] Foreign Application Priority Data

Jan. 13, 1984 [JP] Japan ................................ 59-4999

[51] Int. Cl.$^4$ ............................................. C08L 63/10
[52] U.S. Cl. .................................. 523/400; 525/502; 525/531; 525/922
[58] Field of Search ................ 523/400; 525/502, 531, 525/922

[56] References Cited

U.S. PATENT DOCUMENTS

| 3,301,743 | 1/1967 | Fekete et al. | 525/531 |
| 3,317,465 | 5/1967 | Doyle et al. | 525/531 |
| 3,373,075 | 3/1968 | Fekete et al. | 525/922 |
| 4,358,477 | 11/1982 | Noomen et al. | 525/922 |

Primary Examiner—Lewis T. Jacobs
Attorney, Agent, or Firm—Sughrue, Mion, Zinn, Macpeak & Seas

[57] ABSTRACT

A reinforced plastic molding having excellent heat resistance, toughness and adhesion property to a fibrous substrate is disclosed, comprising a fibrous substrate having impregnated and cured therein a curable composition comprising tri(meth)acrylate of trishydroxyalkyl isocyanurate, a modified phenol novolak-based epoxy resin and a polymerization initiator.

9 Claims, 1 Drawing Figure

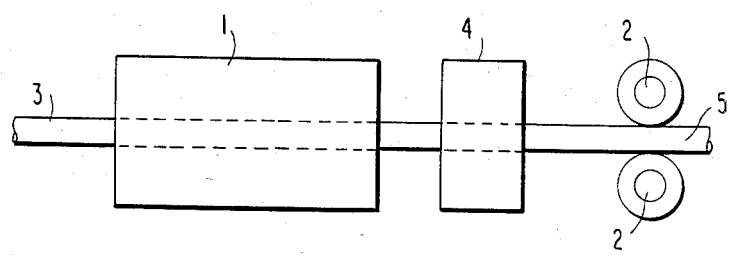

REINFORCED PLASTIC MOLDING

FIELD OF THE INVENTION

The present invention relates to a reinforced plastic molding having an excellent heat resistance.

BACKGROUND OF THE INVENTION

As resin starting materials for use in production of a reinforced plastic molding (hereinafter merely referred to as "FRP"), thermoplastic resins such as a polyethylene phthalate or a polybutylene phthalate, and thermosetting resins such as an unsaturated polyester resin or an epoxy resin have heretofore been used. In recent years, it has been required for FRP to have an excellent heat resistance and it is now necessary to develop resin starting materials for such a heat resistant FRP.

Various resin starting materials have been proposed for this purpose. FRP produced using these resin starting materials, however, do not satisfy both the requirements of a heat resistance and a toughness inherent therein. For example, if a compound having a heterocyclic ring such as an isocyanurate ring is blended to increase the heat resistance, the heat resistance of the resulting FRP is improved but its toughness deteriorates. In many resin starting materials, it is necessary to use solvents in preparation of the desired FRP, and their pot lives are short. Those suffer from the disadvantage that the workability is poor.

SUMMARY OF THE INVENTION

Accordingly, an object of the present invention is to provide a heat resistant FRP satisfying both the heat resistance and toughness using resin starting materials which are free from the above-described problems.

The FRP according to the present invention comprises a fibrous substrate having impregnated and cured therein a curable composition comprising
  (a) tri(meth)acrylate of trishydroxyalkyl isocyanurate,
  (b) a modified phenol novolak-based epoxy resin comprising a phenol novolak-based epoxy resin having introduced therein (meth)acryloyl groups, and
  (c) a polymerization initiator.

BRIEF DESCRIPTION OF THE DRAWING

FIGURE is a schematic flow diagram showing the process for the production of the FRP according to the present invention.

DETAILED DESCRIPTION OF THE INVENTION

The term "(meth)acrylate" used herein means "acrylate" and/or "methacrylate" and the term "(meth)acryloyl group" used herein means "acryloyl group" and/or "methacryloyl group".

The curable composition comprising Components (a), (b) and (c) described above according to the present invention is cured to prepare a cured product in FRP. Since the isocyanurate ring is contained in the basic skeleton, the cured product has an excellent heat resistance, and also since the phenol novolak-based epoxy resin is contained in the basic skeleton, the cured product has an excellent mechanical strength without deteriorating the heat resistance and also has an excellent adhesion property to the fibrous substrate. Consequently, the FRP of the present invention has not only an excellent heat resistance but also an excellent toughness.

The curable composition as the resin starting material for the FRP of the present invention can be handled without a solvent or only with a small amount of a solvent in production of the FRP. The curable composition is thermocurable, has no problem in the pot life and has a high thermocurable rate, resulting in improving the productivity of FRP.

Component (a), tri(meth)acrylate of trishydroxyalkyl isocyanurate, in the curable composition for use in the production of the FRP of the present invention is a compound represented by the following formula:

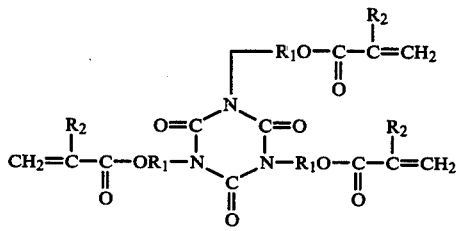

wherein $R_1$ is an alkylene group, and $R_2$ is a hydrogen atom or a methyl group.

Examples of Component (a) are triacrylate of tris(2-hydroxyethyl) isocyanurate (m.p., 52°–54° C.) and trimethacrylate of tris(2-hydroxyethyl) isocyanurate (m.p., 80°–82° C.). This Component (a) can increase the heat resistance of the cured product since it contains an isocyanurate ring.

Component (b) in the curable composition is a modified phenol novolak-based epoxy resin which is generally prepared by reacting (meth)acrylic acid with a phenol novolak-based epoxy resin containing at least 4, preferably from 4 to 7, epoxy groups in the molecule, by which at least 4, preferably from 4 to 7, acryloyl or methacryloyl groups are introduced. In this modified phenol novolak-based epoxy resin, an epoxy group may remain partly in the molecule.

By using the above modified phenol novolak-based epoxy resin in combination with the above Component (a), the mechanical strength and adhesion property to the fibrous substrate of the cured product can be increased without deteriorating the heat resistance provided by Component (a). On the other hand, if the modified phenol novolak-based epoxy resin is replaced by a modified bisphenol-based epoxy resin prepared by modifying a bisphenol-based epoxy resin in the same manner as above, a cured product having a poor heat resistance is merely obtained. Therefore, such a modified bisphenol-based epoxy resin is not preferred to use.

The curable composition of the present invention is composed mainly of Components (a) and (b) as described above. With regard to the proportion of Component (a) to Component (b) those are used in the proportions such that Component (a) constitutes from 20 to 90% by weight, preferably from 30 to 80% by weight, based on the total weight of Components (a) and (b). If the proportion of Component (a) is too small, the heat resistance of the cured product is insufficient. On the other hand, if the proportion thereof is too large, a cured product becomes brittle, resulting in reducing the mechanical strength, and the adhesion property to the fibrous substrate is insufficient.

In order to adjust the viscosity of the curable composition or the elongation and hardness of the cured product, other compounds containing (meth)acryloyl groups (Component (d)) may be added in an amount of 60% by weight or less based on the weight of the curable composition. Particularly preferred examples of such compounds are bisphenol-based epoxy di(meth)acrylates such as di(meth)acrylate of dioxydiethylene glycol of bisphenol A or F. In addition, trimethylolpropane tri(meth)acrylate, pentaerythritol tri(meth)acrylate, pentaerythritol tetra(meth)acrylate and the like can be used. If the proportion of Component (d) is too large, the heat resistance and mechanical strength of the cured product deteriorate.

As the polymerization initiator, Component (c) of the curable composition, organic peroxides such as benzoyl peroxide, di-tert-butyl peroxide or tert-butyl perbenzoate are preferably used. In addition, known polymerization initiators such as azo compounds can be used. The amount of the polymerization initiator used is from 0.1 to 5 parts by weight, preferably from 0.5 to 3 parts by weight, per 100 parts by weight of Component (a) plus Component (b).

To the curable composition of the present invention can be blended modifying resins and various additives in an amount so as not to deteriorate the characteristics of the curable composition. Modifying resins which can be used include a phenol resin, an epoxy resin, and a silicone resin. Additives which can be used include a silane coupling agent for increasing adhesion property, a pigment, and a filler.

The curable composition of the present invention can be prepared in the form of either solid or liquid at room temperature by appropriately determining its formulation. Moreover, the curable composition may be converted into a solution using a small amount of a solvent. Such a form can be determined appropriately depending on a method of molding the curable composition. The curable composition is generally cured by heating at 80° to 250° C. for about 1 to 10 minutes to prepare a cured product having excellent heat resistance, mechanical strength and adhesion property to the fibrous substrate.

Fibrous substrates which can be used in the FRP of the present invention include inorganic fibers such as glass fibers, carbon fibers or fibers made of metals or metal oxides, and organic fibers such as aramide fibers. These fibrous substrates can be used in various forms such as in the form of yarns, rovings, chop strands, matts, cloths or roving cloths.

The FRP of the present invention is produced using the fibrous substrate and curable composition as described above. In production of the FRP, various known FRP molding methods can be widely employed. The molding method is determined appropriately depending on the purpose of use of the FRP. Molding methods which can be employed include press-molding methods such as the SMC process (Sheet Molding Compound Process) or the BMC process (Bulk Molding Compound Process), and continuous molding methods such as filament winding, drawmolding or continuous lamination.

The FIGURE is a schematic flow diagram showing the process for the production of the FRP of the present invention according to the draw-molding method. Continuous filaments 3-3 impregnated with a curable composition are pulled into a heating die 1 (die temperature: 100° to 180° C.) by means of a traction unit 2 provided at the rear of the heating die 1 and, while moving the continuous filaments 3-3 through the heating die 1 in its axial direction usually at a rate of 1 to 100 m/min, the curable composition is cured together with the continuous filaments 3-3 into one body. If necessary, the cured product is further passed through a post-curing furnace 4 to obtain an FRP having more excellent heat resistance and toughness.

The present invention is described in greater detail by reference to the following examples. Unless otherwise indicated, all percents, parts, ratios and the like are by weight.

EXAMPLE 1

20 parts of triacrylate of tris(2-hydroxyethyl) isocyanurate, 30 parts of a modified phenol novolak-based epoxy resin (containing in average 5.5 acryloyl groups in the molecule), 50 parts of diacrylate of bisphenol F dioxydiethylene glycol and 1 part of tert-butyl perbenzoate were mixed and dissolved to prepare a curable composition having a viscosity of 8,100 cps (25° C.).

Glass fiber rovings were impregnated with the above-prepared curable composition, pulled into a heating die (hole diameter: 1.0 mm, length: 1,000 mm, die temperature: 150° C.), and draw-molded at a rate of 1 m/min to produce a linear FRP having a diameter of 1.0 mm (glass fiber content: 70% by volume).

EXAMPLE 2

40 parts of triacrylate of tris(2-hydroxyethyl) isocyanurate, 20 parts of a modified phenol novolak-based epoxy resin (containing in average 5.5 acryloyl groups in the molecule), 20 parts of diacrylate of bisphenol F dioxydiethylene glycol, 20 parts of trimethylolpropane triacrylate and 1 part of tert-butyl perbenzoate were mixed and dissolved to prepare a curable composition having a viscosity of 4,650 cps (25° C.).

Using this composition, a linear FRP having a diameter of 1.0 mm was produced in the same manner as in Example 1.

EXAMPLE 3

50 parts of trimethacrylate of tris(2-hydroxyethyl) isocyanurate, 25 parts of a modified phenol novolak-based epoxy resin (containing in average 5.5 acryloyl groups in the molecule), 25 parts of trimethylolpropane triacrylate, and 1 part of tert-butyl perbenzoate were mixed and dissolved to prepare a curable composition having a viscosity of 8,100 cps (25° C.).

Using this composition, a linear FRP having a diameter of 1.0 mm was produced in the same manner as in Example 1.

EXAMPLE 4

40 parts of triacrylate of tris(2-hydroxyethyl) isocyanurate, 20 parts of a modified phenol novolak-based epoxy resin (containing in average 5.5 methacryloyl groups in the molecule), 40 parts of diacrylate of bisphenol F dioxydiethylene glycol and 1 part of tertbutyl perbenzoate were mixed and dissolved to prepare a curable composition having a viscosity of 5,300 cps (25° C.).

Using this composition, a linear FRP having a diameter of 1.0 mm was produced in the same manner as in Example 1.

COMPARATIVE EXAMPLE 1

30 parts of a modified phenol novolak-based epoxy resin (containing in average 5.5 acryloyl groups in the molecule), 40 parts of diacrylate of bisphenol F dioxydiethylene glycol, 30 parts of trimethylolpropane triacrylate and 1 part of tert-butyl perbenzoate were mixed and dissolved to prepare a curable composition having a viscosity of 5,700 cps (25° C.).

Using this composition, a linear FRP having a diameter of 1.0 mm was produced in the same manner as in Example 1.

COMPARATIVE EXAMPLE 2

30 parts of triacrylate of tris(2-hydroxyethyl) isocyanurate, 40 parts of a modified bisphenol A-based epoxy resin (containing in average 2 acryloyl groups in the molecule), 30 parts of trimethylolpropane triacrylate and 1 part of tert-butyl perbenzoate were mixed and dissolved to prepare a curable composition having a viscosity of 4,800 cps (25° C.).

Using this composition, a linear FRP having a diameter of 1.0 mm was produced in the same manner as in Example 1.

The linear FRP having a diameter of 1.0 mm as produced in Examples 1 to 4 and Comparative Examples 1 and 2 were measured for the heat resistance and flexural strength.

Heat Resistance

The temperature of a linear FRP was raised at a rate of 5° C./min in the state that it was bent in a circular form having a diameter of 250 mm, and a temperature at which cracks were formed was determined.

Flexural Strength

Measured according to U.S. Army Specification "MIL-R-9300B TYPE II".

The results obtained are shown in the Table below.

TABLE

|  | Heat Resistance (°C.) | Flexural Strength (kg/mm$^2$) |
| --- | --- | --- |
| Example 1 | 200 | 58 |
| Example 2 | 230 | 55 |
| Example 3 | 250 | 53 |
| Example 4 | 240 | 52 |
| Comparative Example 1 | 160 | 55 |
| Comparative Example 2 | 180 | 30 |

It can be seen from the above results that the FRP of the present invention has excellent heat resistance and toughness.

While the invention has been described in detail and with reference to specific embodiments thereof, it will be apparent to one skilled in the art that various changes and modifications can be made therein without departing from the spirit and scope thereof.

What is claimed is:

1. A reinforced plastic molding comprising a fibrous substrate having impregnated and cured therein a curable composition comprising
   (a) tri(meth)acrylate of trishydroxyalkyl isocyanurate,
   (b) a modified phenol novolak-based epoxy resin comprising a phenol novolak-based epoxy resin having introduced therein an acryloyl or methacryloyl group, and
   (c) a polymerization initiator.

2. The reinforced plastic molding of claim 1, wherein the tri(meth)acrylate of trishydroxyalkyl isocyanurate is a compound represented by the formula

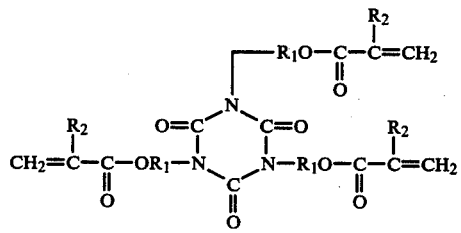

wherein $R_1$ is an alkylene group, and $R_2$ is a hydrogen atom or a methyl group.

3. The reinforced plastic molding of claim 2, wherein the compound is triacrylate or trimethacrylate of tris(2-hydroxyethyl) isocyanurate.

4. The reinforced plastic molding of claim 1, wherein the modified phenol novolak-based epoxy resin has at least 4 acryloyl or methacryloyl groups in the molecule.

5. The reinforced plastic molding of claim 1, wherein the amount of Component (a) is 20 to 90% by weight based on the total weight of Components (a) and (b).

6. The reinforced plastic molding of claim 5, wherein the amount of Component (a) is 30 to 80% by weight based on the total weight of Components (a) and (b).

7. The reinforced plastic molding of claim 1, wherein the amount of Component (c) is 0.1 to 5 parts by weight per 100 parts by weight of Components (a) and (b).

8. The reinforced plastic molding of claim 1, wherein the amount of Component (c) is 0.5 to 3 parts by weight per 100 parts by weight of Components (a) and (b).

9. The reinforced plastic molding of claim 1, wherein the fibrous substrate is an inorganic fiber or an organic fiber.

* * * * *